Oct. 30, 1962   G. W. JACKSON ET AL   3,060,963
CONTROL MECHANISM
Filed July 1, 1955   4 Sheets-Sheet 1
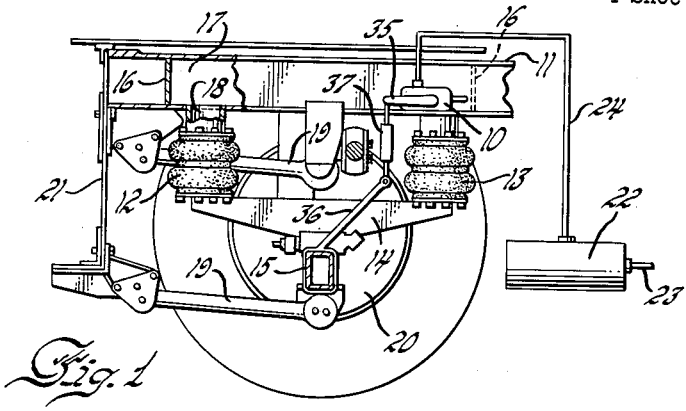
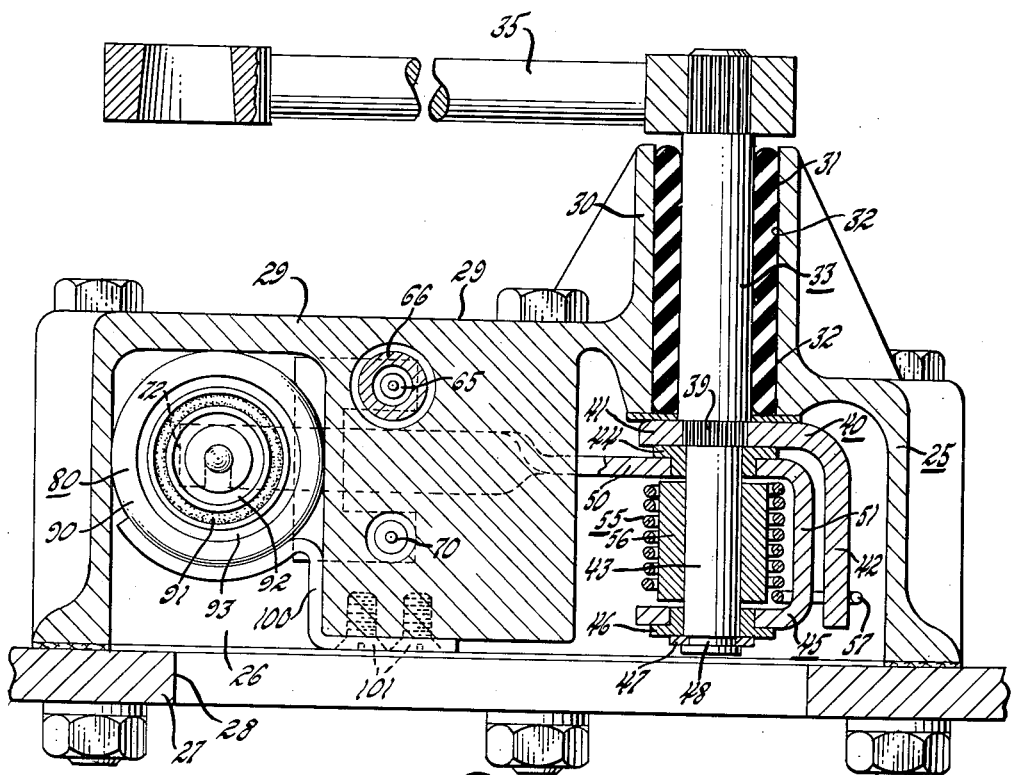
INVENTORS
George W. Jackson
BY John F. Pribonic
Craig V. Morton
THEIR ATTORNEY Oct. 30, 1962 G. W. JACKSON ET AL 3,060,963
CONTROL MECHANISM
Filed July 1, 1955 4 Sheets-Sheet 2

INVENTORS
George W. Jackson
John F. Pribonic
Craig V. Morton
BY
THEIR ATTORNEY

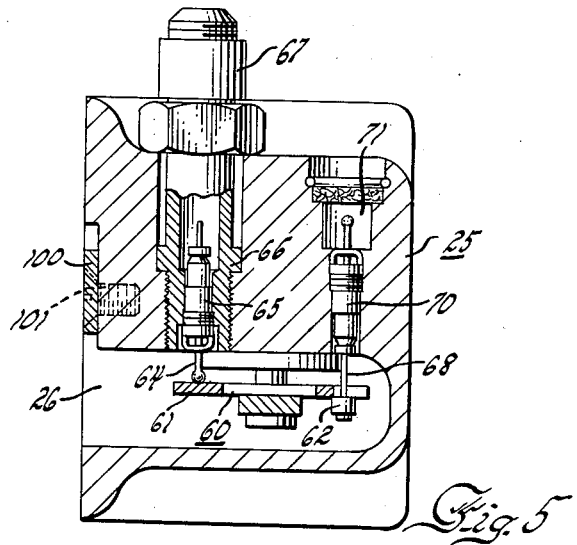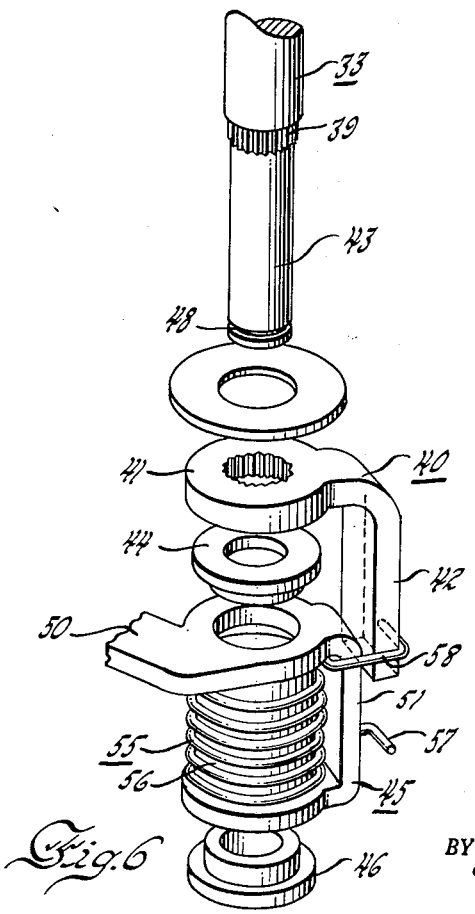

Oct. 30, 1962 G. W. JACKSON ET AL 3,060,963
CONTROL MECHANISM
Filed July 1, 1955 4 Sheets-Sheet 4

INVENTORS
George W. Jackson
BY John F. Pribonic
Craig V. Morton
THEIR ATTORNEY

United States Patent Office 3,060,963
Patented Oct. 30, 1962

3,060,963
CONTROL MECHANISM

George W. Jackson and John F. Pribonic, Dayton, Ohio, assignors to General Motors Corporation, Detroit, Mich., a corporation of Delaware
Filed July 1, 1955, Ser. No. 519,598
8 Claims. (Cl. 137—596)

This invention relates to an improved actuating mechanism and control device to regulate delivery and discharge of air to a pneumatic suspension system for a motor vehicle.

The present invention is particularly adapted for use on vehicles having a suspension system in which expansible bellows type of air spring provide the resilient means for supporting the body of a vehicle upon the axles. The air spring may be in the form of an inflatable bellows heretofore mentioned, or it may be in the form of a piston and cylinder charged with a volume of fluid under sufficient pressure to support the body of the vehicle upon the axle.

It is a well know fact that if the load in a vehicle increases or decreases, the resilient springs of the vehicle allow the body of the vehicle to ride lower relative to the axles when the load increases, the body returning to a normal height position relative to the axles when the vehicle is unloaded.

It is current thinking in vehicle manufacture to position the body of the vehicle at as low a normal position relative to the axle as possible so as to reduce overall height of the vehicle, and thus gain road stability. However, if the spring system of a vehicle is arranged to position the body at a minimum low position relative to the axle, and the spring system is also provided with sufficient resilience as to effect a comfortable ride condition, the body of the vehicle will be insufficiently supported by the spring system when a heavy load is placed in the vehicle causing the body to ride exceptionally low with the result of "bottoming" against the rubber bumpers that are normally provided on the axles of the vehicle to absorb unusual movements of the body.

To obtain full benefit of low "standing height" of a body when the vehicle is unloaded, and yet maintain that same "standing height" when the body is loaded, it is proposed that air springs, such as flexible expansible bellows be provided between the body and the axle as the spring support for the body, and to vary the air pressure within the bellows in proportion to the load carried by the vehicle so as to maintain a relatively constant height level between the body and the axle of the vehicle.

It is an object of this invention to provide an improved actuator for an air spring to regulate the air pressure supplied to or exhausted from the air spring in response to movements of the car body relative to the axle to maintain a relatively constant position of the body relative to the car axle irrespective of the load carried by the body.

It is another object of the invention to provide an actuating control device for an air spring in accordance with the foregoing object wherein the actuating control device is provided with a lost motion movement that is effective in one direction of movement of the actuating control device to effect a delayed operation of the device when supplying air pressure into the air spring to prevent too rapid a response of the effect of increased air pressure in the air spring, and yet provides for an immediate response of the device in the opposite direction of movement so as to effect an immediate close off of the air supply to the air spring.

Further objects and advantages of the present invention will be apparent from the following description, reference being had to the accompanying drawings wherein a preferred form of the invention is clearly shown.

In the drawings:

FIGURE 1 is a schematic view illustrating the use of a control device of this invention in an air spring suspension system for a vehicle.

FIGURE 4 is a horizontal cross sectional view taken along line 4—4 of FIGURE 2.

FIGURE 5 is a vertical cross sectional view taken along line 5—5 of FIGURE 2.

FIGURE 6 is a perspective view of the actuating shaft of the control device, the several parts thereof being illustrated in an exploded arrangement.

Figure 2:
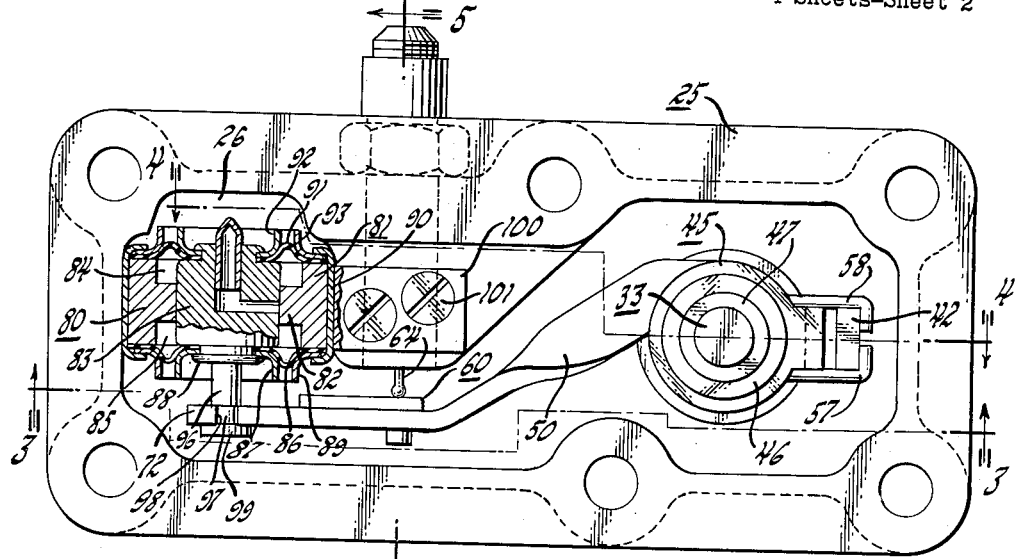
FIGURE 2 is a vertical cross sectional view of the control device used in the system of FIGURE 1.

In FIGURE 1 the control device 10 of this invention is illustrated in use on a vehicle for controlling the air springs of the vehicle.

The vehicle comprises a frame 11 that supports a body in the usual manner, and forms a suspension beam for the expansible bellows type air springs 12 and 13 that are supported between the suspension beam 11 and the suspension support 14 carried on the axle 15. The suspension beam 11 has partition walls 16 that cooperate with the other walls of the suspension beam to form an air chamber 17 with which the air springs 12 and 13 are in open communication through their respective openings 18. The control device 10 may be mounted on a side wall of the suspension beam and communicate directly with the reservoir 17 in the manner shown in FIGURE 3 to supply air to the reservoir and exhaust air therefrom. Radius rods 19 are connected between the front wheel 20 and the frame 21 of the vehicle. A supply tank 22 for air under pressure that receives its air supply through the line 23 from a suitable compressor source is connected with the control device 10 by means of a supply line 24.

The control device comprises a housing 25 that forms a chamber 26 containing the actuating mechanism of the control device. The housing 25 is secured to a wall 27 of the vehicle frame 11 and communicates with the reservoir 17 through the opening 28.

Figure 3:
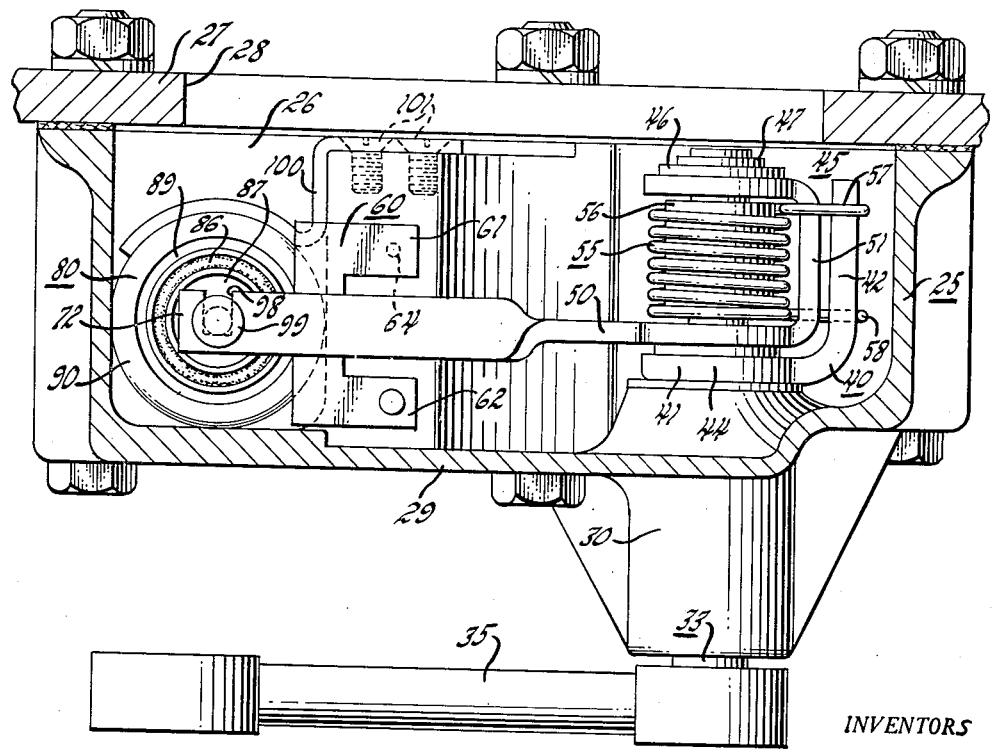
FIGURE 3 is a horizontal cross sectional view taken along line 3—3 of FIGURE 2.

The front wall 29 of the housing 25 carries a boss 30 that extends exteriorly as well as interiorly of the housing as shown in FIGURES 3 and 4. The boss 30 has a bore 32 that contains a rubber or rubber-like sleeve 31 in which there is carried a shaft 33 for operation of the device. The sleeve 31 is forced into the space between the shaft 33 and the interior surface bore 32 to place the body of the sleeve in radial compression, the sleeve 31 supporting the shaft 33 for rotation relative to the bore 32 and providing a fluid seal against leakage of fluid from the chamber 26 and thus from the reservoir 17. The shaft 33 carries an actuating arm 35 on the outer end thereof and as shown in FIGURE 1 the actuating arm 35 is connected with the axle 15 by means of the rigid extension 36 and the link 37 to effect oscillation of the arm 35 upon vertical movement of the axle 15 relative to the frame 11.

The operating shaft 33 has a knurled portion 39 that carries a first lever member 40 having one arm portion 41 secured on the knurled portion 39 whereby the lever 40 will rotate with the shaft 33. A second arm portion 42 of the lever 40 is positioned substantially parallel with the axis of the shaft 33.

The operating shaft 33 has a reduced diameter portion 43 that carries the sleeve members 44 and 46 on which there is supported a second lever member 45. The operating shaft 33 is freely rotatable relative to the lever 45 so that the first lever member 40 can move relatively to the second lever member 45 when rotated by the shaft 33 in a manner hereinafter described.

The lever member 45 is retained on the reduced diameter portion 43 of the operating shaft by means of a snap washer 47 disposed in the groove 48 at the end of the shaft 33.

The lever member 45 has one arm portion 50 that is substantially normal to the axis of the operating shaft 33, and a second arm portion 51 that is substantially parallel with the axis of the shaft 33 and parallel with the arm portion 42 of the lever member 40.

A torsion spring 55 encircles a spacer member 56 carried on the reduced diameter portion 43 of the shaft 33 and has its opposite ends 57 and 58 engaging opposite sides of the arm portion 42 of the lever 40 whereby the arm portion 42 is retained between the spring ends 57 and 58 with the torsion spring urging the spring ends against the arm portion 42.

The arm portion 51 of the second lever 45 is also positioned between the opposite ends 57 and 58 of the torsion spring 55. Thus it will be apparent that rotation of the operating shaft 43 will effect rotation of the first lever 40 which in turn will urge rotation of the second lever 45 about the axis of the shaft 33 through the engagement of the spring ends 57 and 58 of the torsion spring 55. It will also be apparent that if the arm portion 50 of the lever 45 is restrained against movement that the spring ends 57 and 58 of the torsion spring will yield upon rotation of the lever 40 so that this lever can rotate with the shaft 33 and allow the lever 45 to remain stationary, thereby providing for relative motion between the levers 40 and 45.

The arm portion 50 of the lever 45 carries a plate 60 that is in the form of a U-shaped member having the legs 61 and 62. The leg 61 of the plate 60 engages the stem 64 of an air inlet valve 65 positioned in the carrier member 66 that has a fitting attachment 67 to which the supply line 24 is secured by any suitable attachment fixture. The air inlet valve 65 is of the common tire valve variety used in the tires of automotive vehicles.

The leg 62 of the plate 60 engages the stem 68 of the exhaust valve 70 which is of the same type as the air inlet valve 65. It will be noted however that the valve 70 is inserted into the housing 25 in a reverse manner to that of the valve 65 so that an upward movement, see FIG. 5, of the plate 60 will cause the valve 65 to open to allow air to pass into the chamber 26 whereas downward movement of the plate 60 will cause the valve 70 to open and allow air to exhaust from the chamber 26 through the exhaust opening 71 in the housing opening 25.

The outermost end 72 of the arm portion 50 of the lever 45 is connected with a movement impeding device 80 by which the movement of the arm portion 50 and thus the lever 45 is retarded in its rate of movement as urged by rotation of the lever 40 with the operating shaft 33.

The movement impeding device 80, or dash-pot, comprises a cylinder 81 having a transverse wall 82 that has an axial bore receiving the piston 83 that slidably moves in the bore of the transverse wall 82. At opposite sides of the transverse wall 82 there is provided the annular recesses 84 and 85.

A flexible diaphragm 86 extends between one end of the cylinder 81 and one end of the piston 83 to close the recess 85 and thereby form a closed chamber having a flexible wall 86. A retaining ring 87 is placed upon the flexible wall 86 to retain it in engagement with one end of the piston 83, the piston portion 88 being formed over the retaining ring 87 to hold it in place. A retaining ring 89 is positioned over the outer periphery of the flexible wall 86 to hold it in engagement with the cylinder 81, an annular wall 90 being disposed around the cylinder 81 and formed over the retaining ring 89 to hold it in place on the end of the cylinder.

Similarly, a flexible wall 91 is provided between the opposite end of the cylinder 81 and the opposite end of the piston 83, being retained in position by the retaining rings 92 and 93.

The piston 83 is provided with a passage 95 used for filling the chambers 84 and 85 with a liquid that will be displaced between the chambers 84 and 85 upon reciprocal movement of the piston in the bore of the transverse wall 82, suitable clearance being provided between the piston 83 and the bore of the transverse wall to allow a controlled rate of liquid displacement between the chambers 84 and 85 on the reciprocal movement of the piston 83.

The piston 83 is connected with the end 72 of the arm portion 50 by means of the stud 96 having the reduced diameter portion 97 that enters the slot 98 in the end 72 of the lever. The enlarged head 99 confines the lever end 72 between the stud 96 and the head 99.

The annular wall 90 that surrounds the cylinder 81 effects a capsule-like structure of the movement impeding device 80 that is retained in position in the chamber 86 by means of a bracket 100 secured to the housing by means of the screws 101.

Operation of the Device

Under a predetermined minimum load condition in the vehicle, the sprung mass comprising the frame and body of the vehicle is positioned at a predetermined height above the axle of the vehicle. Under this condition, that is under load condition of the body of the vehicle only, the pressure of the air within the air springs 12 and 13 is at a minimum value to position the frame of the vehicle at a predetermined height relative to the axle of the vehicle.

When the load is increased in the vehicle, as when passengers board the same, the resistance of the air springs is insufficient to support the increased load and still maintain the frame of the vehicle at the predetermined height relative to the axle of the vehicle. Thus, when the frame 11 of the vehicle moves downwardly toward the axle 15, the control arm 35 of the control device 10 moves upwardly. This upward movement of the control arm 35 causes rotation of the shaft 33 and thereby rotation of the lever 40. This rotation of the lever 40 will rotate the lever 45 about the axis of the shaft since the arm portion 51 of the lever 45 is confined between the spring ends 57 and 58 of the torsion spring 55. This movement will occur so long as the rate of movement of the arm portion 50 of the lever 45 is at or below the fluid flow rate provided for between the chambers 84 and 85 of the movement impeding device 80.

Upward movement of the arm 50 as a result of the upward movement of the control arm 35 will cause the air pressure inlet valve 65 to be opened and thereby allow air pressure to enter the chamber 17 in the suspension beam and thus enter the air springs 12 and 13 to increase the pressure therein and return the air springs to a state of expansion at which the frame of the vehicle is at the predetermined height relative to the axle of the vehicle. As the lever arm 50 moves downwardly as a result of the relative displacement between the frame 11 and the axle 15 of the vehicle, the air inlet valve 65 will be closed when the predetermined height has been re-established between the frame 11 and the axle 15 of the vehicle.

When the load is reduced in the vehicle, as when passengers leave the same, the lightened load will then allow the air springs 12 and 13 to expand to a greater extent than normal, since they have received air pressure to a value sufficient to support the previously loaded condition.

Under this condition the displacement of the frame 11 upwardly relative to the axle 15 of the vehicle will cause downward movement of the control arm 35 and thus through rotation of the lever 40 and the lever 45 through the torsion spring 55 cause downward movement of the lever arm 50 so as to effect opening of the air exhaust valve 70 to exhaust air from the air springs 12 and 13 until such time as the now downward displacement of the frame 11 relative to the axle 15 causes the arm 35 to move upwardly sufficiently to allow the valve 70 to close. At this time the frame 11 will have reestablished its height position to normal relative to the axle 15.

The foregoing operation takes place when the vehicle is at a standing position. However, when the vehicle is operating on the road, the axle 15 is continuously being displaced relative to the frame of the vehicle which would tend to cause continuous alternate admission of air to the air springs 12 and 13 and thereby waste a large quantity of air and also cause wide variations in the stability of the vehicle body relative to the axle.

To avoid this, the movement impeding device 80 retards movement of the arm 50 of the control device so that the movement of the axle 15 relative to the body of the vehicle caused by road conditions will not cause operation of the valves 65 and 70.

To allow the axle freedom of movement relative to the control device 10 and yet prevent operation of the valves 65 and 70, the torsion spring 55 retains the spring ends 57 and 58 in engagement with the arm portion 42 of the lever 40 so that the lever 40 can rotate relative to the lever 45 without effecting movement of the lever 45 until the average displacement of the control arm 35 is such as to represent a change in the height position of the frame 11 relative to the axle 15. When this occurs, the control device 10 will operate in the manner heretofore described.

Also, to provide for an impeded movement of the inlet control valve 50 for admission of air under pressure to the air springs 12 and 13 followed by immediate closing of the valve 65 when the air pressure in the springs 12 and 13 has reached the value proportionate to the load condition of the vehicle, the movement impeding device and the lever arm 50 coact in a manner to provide a predetermined lost motion movement. This can be effected by filling the chambers 84 and 85 of the movement impeding device 80 to less than full. When this is done, the piston 83 will move through the first portion of movement effected by the arm 50 rapidly to the extent allowed by the unfilled volume in the chambers 84 and 85. On the upward movement of the arm 50 to open the valve 65, this portion of the movement is that which takes up the slack movement of the valve operating stem 64 and places the valve 65 just in open position. Thereafter, further upward movement of the arm 50 of the lever 45 will be an impeded opening of the valve in the manner of operation of the device heretofore described.

Upon a reverse operation, that is to close the valve 65, the lost motion movement through which the arm 50 of the lever 45 passes will now be that which allows for immediate closing of the valve 65, and delayed movement of the arm 50 to open the exhaust valve 70.

It will thus be seen that in one direction of the arm 50, when the lost motion movement is provided in the manner just described, that the valves will be opened under a delayed or impeded movement of the control device and upon reverse action of the valves they will be immediately closed. This allows for delayed response of supply and exhaust of air from the air springs with immediate reverse action of the valves.

Figure 8:
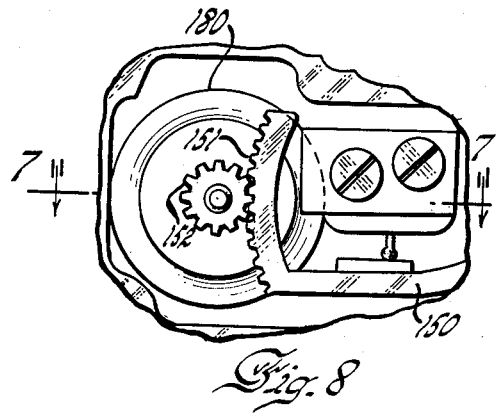
FIGURE 8 is a plan view of a portion of the modified arrangement illustrated in FIGURE 7.
Figure 9:
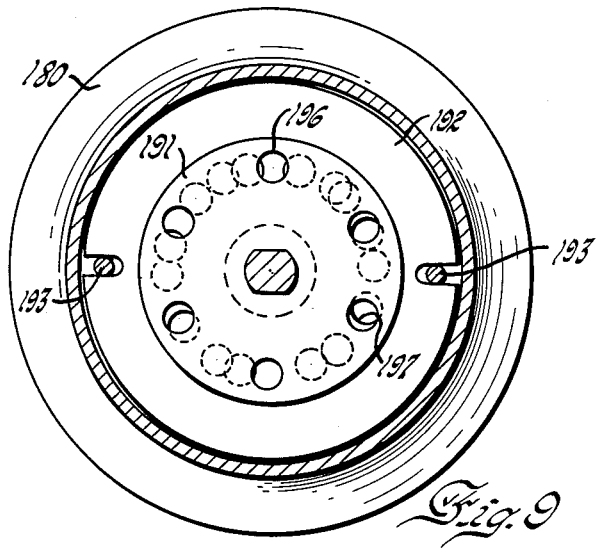
FIGURE 9 is a cross sectional view taken along line 9—9 of FIGURE 7.
Figure 7:
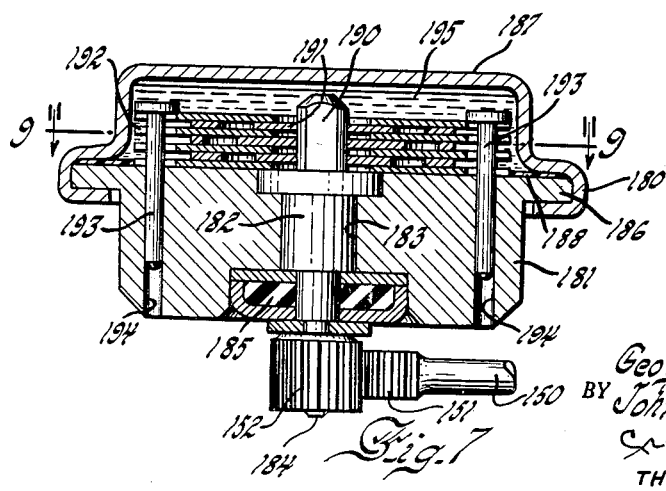
FIGURE 7 is a cross sectional view illustrating a modified arrangement of a movement impeding device for use in the control.

In FIGURES 7, 8 and 9 there is illustrated a modified arrangement of a movement impeding device adapted for use in the control device illustrated in FIGURES 2, 3, and 4. In the modification of FIGURES 7, 8 and 9 the movement impeding device is positioned with the axis thereof normal to the plane of movement of the actuating arm 50 of the control device illustrated in FIGURE 1.

As illustrated in FIG. 8, the arm portion 150, that corresponds with the arm portion 50 of the lever 45 of the device of FIGURE 2 carries a gear segment 151 that meshes with a pinion gear 152 extending from the movement impeding device 180. Oscillating movement of the arm portion 150 effects rotation of the pinion 152 and thereby actuates the movement impeding device 180.

The movement impeding device 180, more clearly shown in FIGURES 7 and 9, comprises a body member 181 that has a shaft 182 journaled in a bore 183. The shaft 182 has a reduced diameter portion 184 that extends from the body 181 and carries the pinion gear 152 that meshes with the gear segment 151. A seal 185 is provided around the shaft 182 to prevent loss of fluid from within the movement impeding device. The body 181 has a radial flange 186 to which there is attached a formed casing member 187 that is secured to the flange 186 by forming the member over the flange with a gasket 188 therebetween.

The shaft 182 has a reduced diameter end portion 190 that has a plurality of disks 191 splined thereon. The disks 191 are thus rotatable with the shaft 182. Interposed between the disks 191 is a series of disks 192 that are held stationary by the anchor pins 193 secured in the body 181 in the bores 194.

The chamber 195 is at least partially filled with a fluid, such as a high viscosity silicone fluid, or other suitable fluid so that rotation of the disks 191 relative to the disks 192 will place the fluid between the disks in shear to thereby produce the desired frictional resistance to movement between the disks which will damp the oscillatory rotatable motion of the shaft 182 as effected by the oscillating movement of the oscillating portion 150.

The disks 191 are each provided with a series of holes 196. The disks 192 are provided with a similar series of holes 197 but of different number so as to provide a labyrinth pass between the disks 191 and 192 to insure proper distribution of the fluid between the disks.

The desired spacing of the disks 191 relative to the disks 192 is maintained by the position of the heads of the pins 193 relative to the body 181, the pins 193 being driven into bores 194 during assembly to give the proper clearance between the disks 191 and 192 to give the desired frictional resistance to movement between the disks as resulting from the shear action on the fluid between the disks.

While the form of embodiment of the invention as herein disclosed constitutes a preferred form, it is to be understood that other forms might be adopted as may come within the scope of the claims which follow.

What is claimed is as follows:

1. A control mechanism, comprising, a support structure, an oscillatable shaft journaled in said structure and including an actuating arm to effect oscillation to the shaft, a first lever fixedly mounted on the shaft and having a portion generally parallel with the axis of the shaft, a second lever mounted on the shaft and having a portion generally parallel with the axis of the shaft and with said portion of said first lever, said shaft being freely rotatable relative to said second lever, a torsion spring around said shaft and having opposite ends thereof engaging opposite sides of said portion of said first lever to confine the said portion of said lever between the said opposite ends, said second lever having the said parallel portion also disposed between said opposite ends of said spring whereby movement of said second lever is effected by said first lever through said opposite ends of said spring which also provide for relative movement between the said parallel portions of said levers, said second lever engaging a control device to actuate the same on movement of said second lever, and a movement impeding device engaged by said second lever to impede movement of the second lever to prevent synchronous movement thereof with said first lever when said first lever is moved at a rate greater than the rate of movement of said second lever.

2. A control mechanism, comprising, a support structure, an oscillatable shaft journaled in said structure and including an actuating arm to effect oscillation to the shaft, a first lever fixedly mounted on the shaft and having a portion generally parallel with the axis of the shaft, a second lever mounted on the shaft and having one portion generally parallel with the axis of the shaft and with said portion of said first lever and an end portion generally radial of said shaft, said shaft being freely rotatable relative to said second lever, a torsion spring around said shaft and having opposite ends thereof engaging opposite sides of said portion of said first lever to confine the said portion of said lever between the said opposite ends, said second lever having the said parallel portion also disposed between said opposite ends of said spring whereby movement of said second lever is effected by said first lever through said opposite ends of said spring which also provides for relative movement between the said parallel portions of said levers, said end portion of said second lever engaging a control means to actuate the same oppositely on opposite directional movements of said second lever, and a movement impeding device also engaged by said end portion of said second lever to impede movement of the second lever to prevent synchronous movement thereof with said first lever when said first lever is moved at a rate greater than the impeded rate of movement of said second lever.

3. In a control mechanism having a housing provided with an oscillatable shaft journaled in the housing with the shaft including an actuating arm disposed exteriorly of the housing to effect oscillation to the shaft and having first and second lever means one of which oscillates with said shaft and the other of which is free relative to said shaft and including resilient means engaging both of the levers to provide for movement of the second lever through the resilient means by the first lever and also provide for relative movement between the levers with the second lever engaging a pair of control devices in the housing to actuate the same separately during movement of the second lever in opposite directions and a movement impeding device in said housing engaging said second lever to restrain movement thereof relative to the first lever; said movement impeding device, comprising, a cylinder having a wall transverse of the cylinder axis, a piston reciprocable slidably in said wall and projecting through the wall, flexible wall means closing each end of said cylinder and engaging the ends of said piston to provide variable capacity chambers at each side of said transverse wall, means providing resistance passage means providing for restricted interchange of fluid between said chambers, and means for connecting said piston with the said second lever to impede movement of the second lever and prevent synchronous movement with the first lever when said first lever is moved at a rate greater than the rate of movement of the second lever as permitted by said impeding device.

4. In a control mechanism having a housing provided with an oscillatable shaft journaled in the housing with the shaft including an actuating arm disposed exteriorly of the housing to effect oscillation to the shaft and having lever means oscillatable thereby actuating control devices in the housing during movement of the lever means in opposite directions; a sealed cartridge movement impeding device in said housing engaging said lever means to restrain movement thereof relative to the shaft and comprising a cylinder having a wall transverse of the cylinder axis, a piston reciprocable slidably in said wall and projecting through the wall, rubber-like diaphragm means closing each end of said cylinder and engaging the ends of said piston to provide variable capacity chambers at each side of said transverse wall, rigid wall means enclosing said cylinder and engaging the outer periphery of said diaphragm means at each end of the cylinder for fluid tight engagement of the diaphragm with the cylinder, rigid wall means at each end of said piston engaging said diaphragm means securing the same on said piston, means providing resistance passage means providing for restricted interchange of fluid between said chambers, and means for connecting said piston with said lever means to impede movement of said lever means and prevent synchronous movement thereof with said shaft when said shaft is moved at a rate greater than the rate of movement of the lever means as permitted by said impeding device.

5. A control mechanism, comprising, a support structure, an oscillatable shaft carried on said support structure and including an actuating arm to effect oscillation of the shaft, a first lever on said shaft for oscillation therewith, a second lever on said shaft with respect to which said shaft is freely rotatable, resilient means connecting said levers to effect movement of said second lever by said first lever and provide for relative movement between said levers, a controlled device on said structure, said second lever engaging said controlled device to actuate the same on movement of said second lever, and a movement impeding device on said structure engaged by said second lever to impede movement of the second lever to prevent synchronous movement thereof with said first lever when said first lever is moved at a rate greater than the rate of movement permitted said second lever by said impeding device, said movement impeding device and said second lever having incorporated in the coacting movements thereof a predetermined lost motion movement effective in one direction of movement of said second lever to effect free lost motion movement of the second lever relative to said controlled device prior to impeded actuating movement thereof actuating said controlled device and effective in the immediate opposite direction of movement of said second lever by said first lever following the said one movement to effect an immediate actuation of the said controlled device during the free lost motion movement before subsequent impeded movement of the second lever in the said opposite direction.

6. A control mechanism, comprising, a support structure, an oscillatable shaft carried on said support structure and including an actuating arm to effect oscillation of the shaft, a first lever on said shaft for oscillation therewith, a second lever on said shaft with respect to which said shaft is freely rotatable, resilient means connecting said levers to effect movement of said second lever by said first lever and provide for relative movement between said levers, a controlled device having an open and a closed position, said second lever engaging said control device to actuate the same between its open and closed position on movement of said second lever, and a movement impeding device on said structure engaged by said second lever to impede movement of the second lever to prevent synchronous movement thereof with said first lever when said first lever is moved at a rate greater than the rate of movement permitted said second lever by said impeding device, said movement impeding device and said second lever having incorporated in the coacting movements thereof a predetermined lost motion movement effective in one direction of movement of said second lever to effect free lost motion movement of the second lever relative to said controlled device prior to impeded opening movement of the controlled device and effective in the immediate opposite direction of movement of said second lever following the said one movement to provide closing movement of the said controlled device during the free lost motion movement before subsequent impeded movement of the second lever in the said opposite direction.

7. Control apparatus, including, separate controlled valve means operable to open in alternate directions, a member having alternate movement in two different directions operably connected with said valve means for operating said valve means alternately on alternate movement of said member, and movement impeding means operably connected with said member to impede movement of said member in either direction of movement thereof in operating said valve means, said member and said movement impeding means having incorporated in their coacting operating connection with said valve means a predetermined lost motion movement effective in one direction of movement of said member to provide a free lost motion movement of said member prior to impeded actuating movement of one of said valve means and effective in the immediate alternate movement of said member to provide a free lost motion movement of said member to return said one valve means towards its initial closed position prior to an impeded movement of the other of said valve means on continued movement of said member in said alternate direction.

8. Control apparatus, including, separate controlled valve means one of which is operable as a fluid pressure admission valve and the other of which is operable as a fluid pressure exhaust valve for a controlled device, a member having alternate movement in two different directions operably connected with said valve means for operating said valve means separately on alternate movement of said member, and movement impeding means operably connected with said member to impede movement of said member in either direction of movement thereof in operating said valve means, said member and said movement impeding means having incorporated in their coacting operating connection with said valve means a predetermined lost motion movement effective in one direction of one movement of said member to provide a free lost motion movement of said member prior to impeded actuating movement of one of said valve means and effective in the immediate alternate movement of said member to provide a lost motion movement of said member to permit closing of said one valve means prior to an impeded opening movement of the other of said valve means on continued movement of said member in said alternate direction.

References Cited in the file of this patent
UNITED STATES PATENTS

| | | |
|---|---|---|
| 955,641 | Gielow | Apr. 19, 1910 |
| 989,543 | Geissinger | Apr. 11, 1911 |
| 1,990,517 | Bedford | Feb. 12, 1935 |
| 2,141,215 | Leighton | Dec. 27, 1938 |
| 2,547,483 | Mersereau | Apr. 3, 1951 |
| 2,608,207 | Le Van | Aug. 26, 1952 |
| 2,670,201 | Rossman | Feb. 23, 1954 |
| 2,691,420 | Fox | Oct. 12, 1954 |
| 2,757,376 | Brueder | July 31, 1956 |